Figure 1:
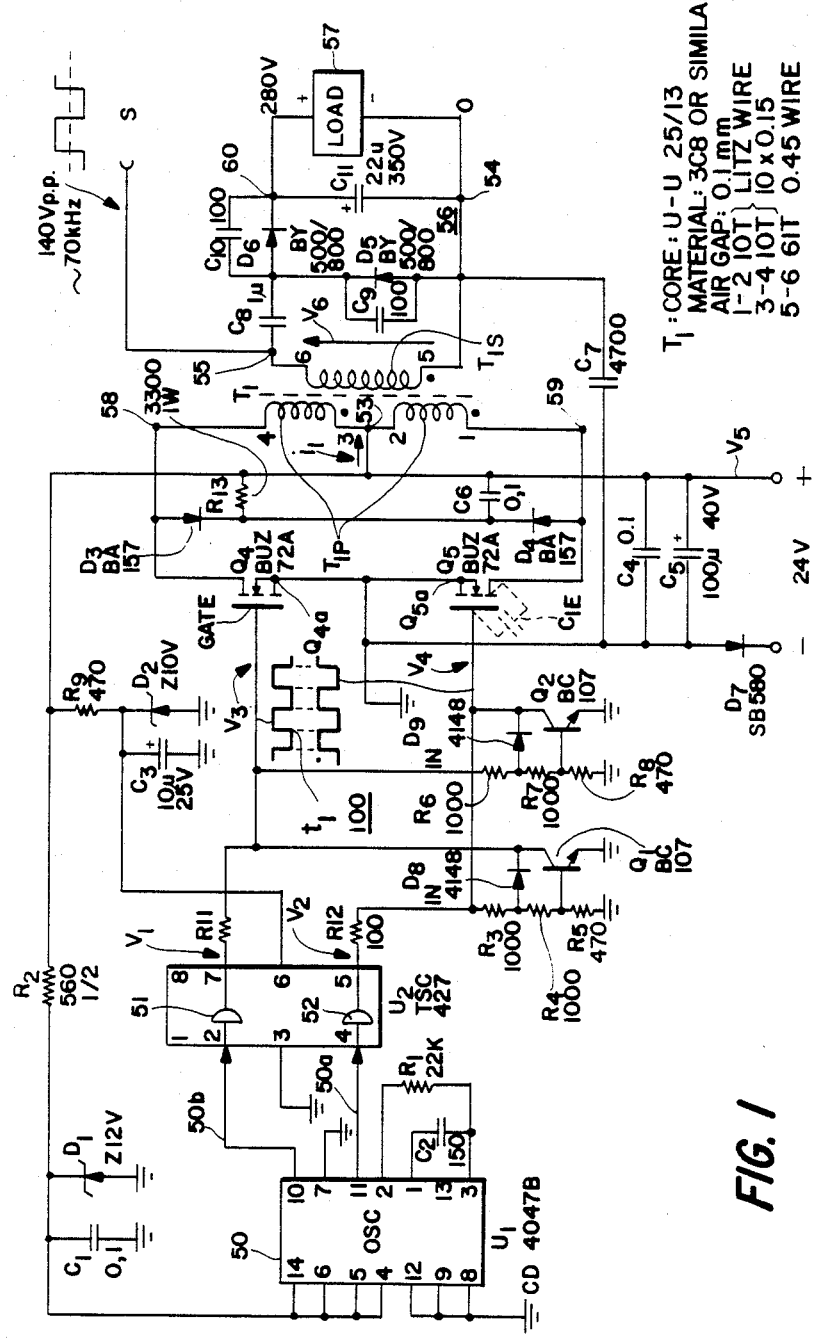

United States Patent [19]

Haferl

[11] Patent Number: 4,829,415
[45] Date of Patent: May 9, 1989

[54] PUSH-PULL DRIVE CIRCUIT FOR A POWER CONVERTER

[75] Inventor: Peter E. Haferl, Adliswil, Switzerland

[73] Assignee: RCA Licensing Corporation, Princeton, N.J.

[21] Appl. No.: 155,449

[22] Filed: Feb. 12, 1988

[30] Foreign Application Priority Data

Mar. 17, 1987 [GB] United Kingdom ............... 8706275

[51] Int. Cl.⁴ .......................................... H02M 3/135
[52] U.S. Cl. ........................................ 363/26; 363/56; 363/133; 361/90
[58] Field of Search ...................... 363/22–26, 363/56, 97, 131, 133, 134; 361/90, 91, 92, 93, 111

[56] References Cited

U.S. PATENT DOCUMENTS 3,859,583  1/1975  Reed .................... 363/DIG. 1 X
4,150,426  4/1979  Jansson ................ 363/DIG. 1 X
4,184,128  1/1980  Nilssen ...................... 363/22 X
4,319,315  3/1982  Keeney, Jr. et al. ........... 363/22
4,441,087  4/1984  Nilssen ...................... 363/22 X
4,456,949  6/1984  Incledon ..................... 363/26
4,628,284  12/1986 Bruning et al. ............... 363/22 X Primary Examiner—Patrick R. Salce
Assistant Examiner—Emanuel Todd Voeltz
Attorney, Agent, or Firm—Paul J. Rasmussen; Joseph J. Laks; Sammy S. Henig

[57] ABSTRACT

A power supply includes a source of first and second switching signals that are at opposite phases. First and second MOS power transistors have main current conducting electrodes coupled to a transformer and have gate electrodes that are respectively coupled to the first and second signals to provide push-pull operation. When a transition occurs in a first one of the MOS transistors from a conductive state to a nonconductive state, a voltage is developed at its gate electrode due to its input Miller capacitance. The gate electrode voltage is coupled to a control terminal of a controllable attenuator that attenuates the switching signal that is coupled to the gate of the other MOS transistor. This delays the initiation of the conductive state in the other MOS transistor until immediately after the first transistor becomes nonconductive, thereby avoiding simultaneous conduction in the two transistors.

15 Claims, 2 Drawing Sheets

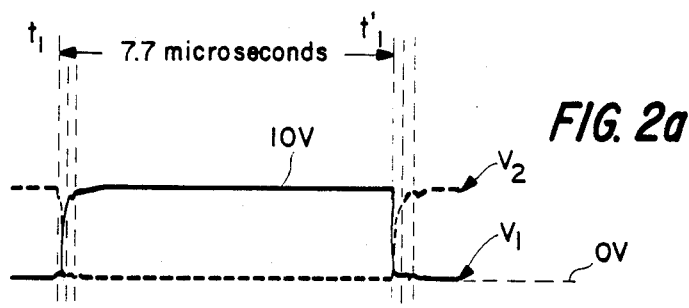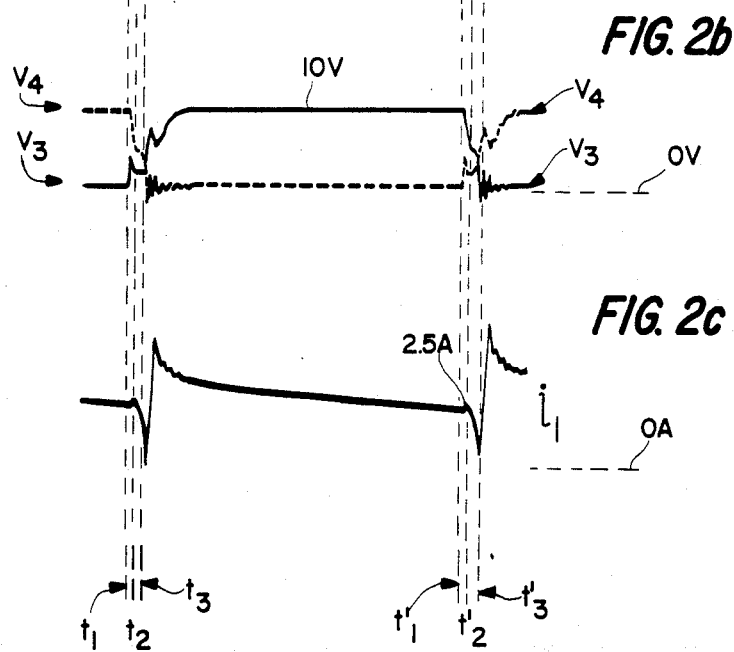

PUSH-PULL DRIVE CIRCUIT FOR A POWER CONVERTER

The invention relates to power supply system and, in particular, to a drive circuitry of a push-pull stage in a DC-to-DC converter power supply of, for example, a television apparatus.

In some television power supply applications, such as in a battery operated television system, it may be desirable to convert an input source of direct voltage, such as a battery, to a supply of direct output voltage that is at, for example, a higher voltage level. This is conventionally achieved using a circuit known as a DC-to-DC converter. In such a converter the available input DC voltage is chopped to generate an AC voltage which can, in turn, be stepped up or down to a desired voltage level using a transformer. The AC voltage is rectified and filtered to obtain a DC output voltage that is coupled to energize various stages in the television system.

Chopping of the input DC voltage may be done in a push-pull manner by transistor switches that are coupled to corresponding pair of terminals of a primary winding of the transformer. The input DC voltage is coupled to a terminal located intermediate the pair of terminals. The transistor switches are turned on and off, alternately, by control signals at corresponding control electrodes of the transistor switches to form the corresponding alternately changing polarities of the AC voltage. The AC voltage is then transformer coupled and rectified to form the output voltage.

It has been recognized that due to high current switching of the transistor switches, it is desirable to prevent the transistor switches from being simultaneously conductive. It has been also recognized that the conduction time of each transistor switch may be a function of various circuit parameters which may vary. It is known to inhibit simultaneous conduction in a manner that automatically takes into account the pertinent parameters that affect switching delays. Such parameters may be different for different transistor switches and may be affected by environmental conditions like temperature.

It may be desirable to control the conduction time of the transistor switches using control signals that are nonoverlapping in a manner that, advantageously, reduces a dead time that occurs when none of the transistor switches conducts. Reducing the dead time, advantageously, increases the power efficiency. Reducing the dead time also, advantageously, reduces the amplitude of, for example, the second harmonic relative to the fundamental frequency of the AC voltage. Advantageously, filtering out of AC components from the DC output voltage is simplified. It may be desirable to reduce the dead time dynamically in a manner that takes into account the values of the pertinent parameters of, for example, the transistor switches, which parameters may vary and affect the switching conduction and delay times.

In carrying out a feature of the invention, first and second signals at corresponding frequencies are coupled to corresponding control electrodes of a pair of transistor switches to control switching timings of the transistors. The signal at the control electrode of the first transistor switch includes a portion signal that is fed back from a main current conducting terminal of the first transistor switch and that is indicative when the first transistor is conductive. The signal at the control electrode of the first transistor switch is coupled to the control electrode of the second transistor switch to control the level of the signal at the control electrode of the second transistor switch in a manner that automatically inhibits the second transistor switch from being conductive so long as the first transistor switch is conductive. Similarly, the signal that is developed at the control electrode of the second transistor switch is coupled to the control electrode of the first transistor switch to perform an analogous function to that of the signal in the control electrode of the second transistor switch. Consequently, simultaneous conduction in the first and second transistor switches is, advantageously, prevented and the dead time is dynamically reduced.

The portion signal that is fed back may be developed as a result of capacitive coupling of a signal from the main current conducting electrode of, for example, the first transistor switch, that may be of the MOSFET type, to the control electrode of the first transistor switch via, for example, an inter-electrode capacitance. The inter-electrode capacitance coupling occurs mainly during a transition time from conduction to nonconduction in the first transistor switch because of input capacitance multiplication phenomenon, known as the Miller effect or Miller capacitance.

In accordance with an aspect of the invention, a power supply apparatus includes an output stage that operates in a push-pull manner. A first transistor of the output stage has corresponding first and second main current conducting electrodes that form a main current path. The first main current conducting electrode of the first transistor is coupled to a first terminal of a load. A second transistor of the output stage has corresponding first and second main current conducting electrodes. The first main current conducting electrode of the second transistor is coupled to a second terminal of the load. A source of first and second switching signals is coupled to corresponding control electrodes of the first and second transistors such that the first signal determines in a given period thereof a first instant when the first transistor begins changing from being conductive to being nonconductive. The second signal determines in the given period when the second transistor becomes nonconductive. A third signal is developed at the control electrode of the first transistor that is indicative of a magnitude of a current that flows between the main current conducting electrodes of the first transistor. An arrangement responsive to the third signal generates a control, fourth signal that is coupled to the control electrode of the second transistor to prevent the second transistor from conducting in the given period, provided that a magnitude of the current that flows in the first transistor is greater than a first predetermined level. Thereby, simultaneous conduction of the first and second transistors that operate in the push-pull manner is avoided. The third signal at the control electrode of the first transistor is applied to the fourth signal generating arrangement via a signal path that bypasses the main current path of the first transistor.

FIG. 1 illustrates a drive circuitry, embodying aspects of the invention, of a push-pull stage in a DC-to-DC converter power supply; and FIGS. 2a-2c illustrate waveforms useful in explaining the operation of the circuit of FIG. 1.

FIG. 1 illustrates a battery operated television apparatus power supply. The power supply includes an oscillator 50 that generates signals 50a and 50b of substantially opposite phases, at, for example, approximately 70 kHz that are coupled via corresponding driver stages 51 and 52 to form corresponding signals $V_1$ and $V_2$. Signals $V_1$ and $V_2$ each having a square waveform of 50% duty cycle, are also of opposite phases. All the transitions in signals $V_1$ and $V_2$ occur substantially simultaneously. Signals $V_1$ and $V_2$ are coupled via corresponding current limiting and sampling resistors $R_{11}$ and $R_{12}$ to corresponding gate electrodes of MOSFET power transistors $Q_4$ and $Q_5$. Consequently, signals $V_3$ and $V_4$ that are at substantially opposite phases are formed at the gates of transistors $Q_4$ and $Q_5$, respectively. The waveforms of signals $V_3$ and $V_4$, are waveshaped, in accordance with an aspect of the invention, in a manner that is described in detail later on.

A pair of corresponding main current conducting electrodes $Q_{4a}$ and $Q_{5a}$ of transistors $Q_4$ and $Q_5$, respectively, are each coupled to ground. A second pair of corresponding main current conducting electrodes of transistors $Q_4$ and $Q_5$ are coupled to corresponding end terminals 58 and 59 of a primary winding $T_{1P}$ of a step-up transformer $T_1$. A terminal 53 of primary winding $T_{1P}$ of transformer $T_1$, coupled intermediate terminals 58 and 59, is coupled to a battery generated DC voltage $V_5$ that is referenced to ground. As a result of the push-pull operation of transistors $Q_4$ and $Q_5$, an AC voltage $V_6$ is developed across a secondary winding $T_{1S}$ of transformer $T_1$. AC voltage $V_6$ is coupled via a conventionally built voltage doubler 56 to a load 57 for generating a DC output voltage that is, for example, substantially higher than battery voltage $V_5$ and that is developed between a terminal 60 of load 57 and a terminal 54. Load 57 may represent the equivalent load formed by a television circuitry, not shown in the FIGURES, that is energized by the power supply of FIG. 1.

FIGS. 2a-2c illustrate waveforms useful for explaining the operation of the circuit of FIG. 1. Similar numbers and symbols in FIGS. 1 and 2a-2c indicate similar items of functions.

A waveshaping arrangement 100 of FIG. 1, embodying an aspect of the invention, receives signals $V_1$ and $V_2$ and generate signals $V_3$ and $V_4$, that are coupled to the gate electrodes of transistors $Q_4$ and $Q_5$, respectively. Arrangement 100, advantageously, prevent simultaneous conduction of transistors $Q_4$ and $Q_5$ in an automatic manner.

Prior to time $t_1$ of FIG. 2a, transistor $Q_4$ of FIG. 1 is maintained nonconductive by signal $V_1$ that is zero and transistor $Q_5$ is maintained conductive by signal $V_2$ that is 10 volts. At time $t_1$ of FIG. 2a, signal $V_1$ changes rapidly from substantially zero volts to 10 volts. Simultaneously, signal $V_2$ changes from 10 volts to zero volts. As a result of signal $V_2$ changing to zero volts, signal $V_4$ of FIG. 2b begins changing in a fast transition from a value of that is approximately 10 volts toward a lower value. At time $t_2$, when signal $V_4$ has reached a level of approximately 5 volts, transistor $Q_5$ of FIG. 1 begins operating in its active region that causes the impedance between its main current conducting electrodes to increase and the voltage at terminal 59 to become a positive high voltage. This increase in the voltage at terminal 59 is capacitively coupled back to the control, or gate electrode of transistor $Q_5$ through an interelectrode capacitance $C_{IE}$ that is shown in FIG. 1 by a dashed line. The result is an equivalent large input capacitance at the gate of transistor $Q_5$. The large input capacitance is referred to as the Miller capacitance.

Each of transistors $Q_4$ and $Q_5$ of FIG. 1 employs, illustratively, a MOSFET transistor of the type BUZ 72A that has a gate input capacitance of 440 pF at $V_{GS}=0$ V and at $V_{DS}=25$ V. During the transition time from conduction to nonconduction of transistor $Q_5$, for example, the input capacitance is increased to 25,000 pF, as a result of the Miller effect. The Miller capacitance that is large causes signal $V_4$ of FIG. 2b to remain at approximately 5 volts for a relatively long duration that is from time $t_2$ and until time $t_3$. Consequently, transistor $Q_5$ of FIG. 1 remains conductive during the interval $t_1$-$t_3$.

In accordance with an aspect of the invention, signal $V_4$ is coupled via a voltage divider that includes a series arrangement of resistors $R_3$, $R_4$ and $R_5$ to develop a voltage across resistor $R_5$ that is coupled between the base and emitter electrodes of a transistor $Q_1$. The collector electrode of transistor $Q_1$ is coupled to the gate electrode of transistor $Q_4$ and to a corresponding terminal of resistor $R_{11}$. Thus, resistor $R_{11}$ and transistor $Q_1$, operating as a controllable impedance, function as a voltage attenuator that attenuates the level of signal $V_3$ as long as transistor $Q_5$ and, hence, as long as transistor $Q_1$, remain conductive. As long as signal $V_4$ is above a predetermined level that is indicative of transistor $Q_5$ being conductive, the voltage attenuator that includes resistor $R_{11}$ and transistor $Q_1$ automatically holds down the level of signal $V_3$ to prevent signal $V_3$ from exceeding the threshold level of transistor $Q_4$. Thus, advantageously, the attenuator inhibits conduction in transistor $Q_4$ until the input capacitance of transistor $Q_5$ is discharged and transistor $Q_5$ ceases conduction.

In accordance with another aspect of the invention, the control terminal, or the base electrode, of transistor $Q_1$ is coupled to the gate of transistor $Q_5$ in a control signal path that bypasses drain electrode main current path of transistor $Q_5$. Thus, sensing of the current that flows in transistor $Q_5$ is performed, advantageously, without the need for a current sensing resistor in the current path that includes the source and drain electrodes of transistor $Q_5$. Therefore, the current sensing arrangement, advantageously, does not affect any of the peak current in, for example, transistor $Q_5$ and the impedance that is coupled in series with primary winding $T_{1P}$.

A diode $D_8$ having an anode that is coupled at a junction between resistors $R_3$ and $R_4$ and having a cathode that is coupled to the collector of transistor $Q_1$ forms a negative feedback arrangement that, advantageously, keeps transistor $Q_1$ out of being in saturation. The feedback arrangement that includes diode $D_8$ limits the level of signal $V_3$ of FIG. 2b, prior to time $t_3$, to, approximately, 2 volts that is sufficiently low to prevent conduction of transistor $Q_4$ of FIG. 1. After time $t_3$ of FIG. 2b, signal $V_4$ ramps down to a level that is below 4 volts that causes the current between the main current conducting electrodes of transistor $Q_5$ of FIG. 1 to decrease rapidly to zero, resulting in transistor $Q_5$ becoming nonconductive. After time $t_3$, when the level of signal $V_4$ of FIG. 2b ramps downward, transistor $Q_1$ of FIG. 1 is, advantageously, turned off fast because it is not in saturation. The fast turn-off of transistor $Q_1$ enables transistor $Q_4$ to turn on fast to its saturation state after time $t_3$ of FIG. 2b. Thus, the saturation state of transistor $Q_4$ occurs only after transistor $Q_5$ becomes nonconductive.

During the interval $t_1'$-$t_3'$ of FIGS. 2a-2c, when transistor $Q_4$ of FIG. 1 switches from conduction to nonconduction, transistor $Q_2$ controls the waveform shape of signal $V_4$ in a similar manner, as described above, so as to inhibit overlapping conduction of transistors $Q_4$ and $Q_5$, as illustrated in FIG. 2b during the interval $t_1'-t_3'$. Thus, simultaneous conduction of transistors $Q_4$ and $Q_5$ is advantageously, prevented. Furthermore, because arrangement 100 responses automatically to the levels of signals $V_4$ and $V_3$, variation of circuit parameters such as, for example, the Miller capacitance, advantageously, will not defeat the operation of arrangement 100 that dynamically waveshapes signals $V_3$ and $V_4$.

As explained before, arrangement 100 prevents any significant simultaneous conduction in transistors $Q_4$ and $Q_5$ and also, advantageously, reduces the duration of any dead time that occurs when neither of transistor $Q_4$ nor $Q_5$ conducts. By reducing the dead time, the peak current that flows in each of transistors $Q_4$ and $Q_5$, that corresponds with a given level of a load current at secondary winding $T_{1S}$, may be, advantageously, reduced relative to that required when a longer dead time occurs. Therefore, less stringent peak current requirements are imposed on transistors $Q_4$ and $Q_5$.

FIG. 2c illustrates the waveform of a current $i_1$ that flows into terminal 53 of primary winding $T_{1P}$ of transformer $T_1$ of FIG. 1. Current $i_1$ of FIG. 2c flows, prior to time $t_3$, through the lower portion of primary winding $T_{1P}$ of transformer $T_1$ of FIG. 1 between terminals 53 and 59 and through transistor $Q_5$. During the interval $t_3-t_3'$ of FIG. 2c, current $i_1$ of FIG. 1 flows through the upper portion of primary winding $T_{1P}$ between terminals 53 and 58. Note that during switching intervals $t_1-t_3$ and $t_1'-t_3'$ of FIG. 2c, current $i_1$ is interrupted, as shown by the negative going notches, for only a short time. Therefore, advantageously, both current $i_1$ and the resistive losses are small. The positive peaks of current $i_1$ of FIG. 2c, appearing just after times $t_3$ and $t_3'$, respectively, are caused by the operation of voltage doubler 56 that charges capacitors $C_8$ and $C_{11}$.

It should be understood that, advantageously, the operation frequency may be increased without causing a significant change in the peak of current $i_1$. This is so because, in each cycle, the dead times that occurs at, for example, times $t_3$ and $t_3'$ of FIG. 2c, when neither transistor $Q_4$ nor $Q_5$ of FIG. 1 is conductive, are, each, substantially small relative to the conduction intervals.

Arrangement 100 of FIG. 1 employs general purpose NPN transistors with an $f_t$ of 200 MHz. It should be understood that, for example, fast small signal MOSFET transistors may be employed in place of transistors $Q_1$ and $Q_2$.

What is claimed:

1. A power supply apparatus having an output stage that operates in a push-pull manner, comprising:
   a load having first and second terminals;
   a source of an input supply voltage coupled to said load;
   a first transistor of said output stage having corresponding first and second main current conducting electrodes that form a main current path, said first main current conducting electrode of said first transistor being coupled to said first terminal of said load such that when said first transistor is conductive, said input supply voltage is applied to said load via said main current path;
   a second transistor of said output stage having corresponding first and second main current conducting electrodes, said first main current conducting electrode of said second transistor being coupled to said second terminal of said load such that when said second transistor is conductive, said input supply voltage is applied to said load via said first and second main current conducting electrodes of said second transistor;
   a source of first and second switching signals coupled to corresponding control electrodes of said first and second transistors such that said first signal determines in a given period thereof a first instant when said first transistor begins changing from being conductive to being nonconductive and said second signal determines in said given period when said second transistor becomes conductive so as to cause said push-pull manner operation by said first and second transistors; and
   means responsive to a third signal that is developed at said control electrode of said first transistor and that is indicative of a magnitude of a current that flows between said main current conducting electrodes of said first transistor for generationg a control, forth signal that is coupled to said control electrode of said second transistor to prevent said second transistor from conducting in said given period, provided that a magnitude of said current that flows in said first transistor is greater than a first predetermined level, thereby avoiding simultaneous conduction of said first and second transistors, wherein said third signal at said control electrode of said first transistor is applied to said fourth signal generating means via a signal path that bypasses said main current path formed by said first transistor.

2. An apparatus according to claim 1 wherein said fourth signal generating means comprises, a first controllable attenuator responsive to said third signal and coupled between a terminal that develops said second switching signal and said control electrode of said second transistor for coupling said fourth signal that is representative of a portion of said second switching signal to said control electrode of said second transistor such that as long as a difference signal developed between said control and said second main current conducting electrodes of said first transistor is larger than a predetermined value that is indicative of a current level in said first transistor being greater than said predetermined level, said first controllable attenuator attenuates said portion signal that is developed at said control electrode of said second transistor for delaying conduction in said second transistor.

3. An apparatus according to claim 2, wherein said first controllable attenuator comprises a voltage divider coupled to said control electrode of said first transistor, and a third transistor having a main current conducting electrode that is coupled to said control electrode of said second transistor and having a control electrode that is coupled to an output terminal of said voltage divider, said third transistor forming a controllable shunting impedance at said control electrode of said second transistor that varies in accordance with a signal that is developed at said output terminal of said voltage divider and that is proportional to said third signal developed at said control electrode of said first transistor so as to attenuate said signal that is developed at said control electrode of said second transistor as long as said first transistor is conductive and when said first transistor becomes nonconductive, said controllable shunting impedance changes in a manner that causes said second transistor to become conductive.

4. An apparatus according to claim 3 wherein said impedance that is formed by said third transistor assumes a substantially lower value as long as said third signal at said control electrode of said first transistor is greater than a predetermined value.

5. An apparatus according to claim 3 wherein said voltage divider comprises a resistive network and wherein said first controllable attenuator further comprises feedback means coupled between said third transistor and a second output terminal of said resistive network for generating a signal that prevents said third transistor from being in saturation so as to render said second transistor conductive immediately after said first transistor becomes nonconductive.

6. An apparatus according to claim 2 wherein said first controllable attenuator comprises a resistor coupled between a terminal where said second switching signal is developed and said control electrode of said second transistor, and a third transistor having a main current conducting electrode that is coupled at a junction between said resistor and said control electrode of said second transistor such that said resistor and said third transistor attenuate a portion of said second switching signal that is coupled to said control electrode of said second transistor as long as said first transistor is conductive and when said first transistor becomes nonconductive a greater portion of said second switching signal is coupled to said control electrode of said second transistor.

7. An apparatus according to claim 6 further comprising, a fourth transistor having a main current conducting electrode that is coupled to said control electrode of said first transistor and having a control electrode that is coupled to said control electrode of said second transistor, said fourth transistor attenuating said third signal that is developed at said control electrode of said first transistor to prevent simultaneous conduction in both said first and second transistors.

8. An apparatus according to claim 1 wherein said first and second switching signals are substantially anti-phased signals such that all the transition times in both occur simultaneously.

9. An apparatus according to claim 1 wherein said first transistor comprises an MOSFET power transistor.

10. An apparatus according to claim 1 wherein, during an interval that occurs when said first transistor changes from being conductive to being nonconductive, a Miller capacitance couples one of said first and second main current conducting electrodes to said control electrode of said first transistor that causes a delay in a transition of said third signal at said control electrode thereof.

11. An apparatus according to claim 1 wherein said load comprises a primary winding of a transformer and wherein said output supply voltage is developed at a secondary winding of said transformer.

12. A power supply apparatus comprising:
a first winding having first and second terminals for generating a first output supply voltage between said terminals;
a source of an input supply voltage coupled to said winding;
a first MOS power transistor switch having a drain electrode that is coupled to said first terminal of said first winding;
a second MOS power transistor switch having a drain electrode that is coupled to said second terminal of said first winding;
a source of first and second switching signals at opposite phases;
a first impedance coupled between a terminal where said first switching signal is developed and a gate electrode of said first MOS power transistor switch for coupling said first switching signal to said gate electrode of said first MOS power transistor switch;
a second impedance coupled between a terminal where said second switching signal is developed and a gate electrode of said second MOS power transistor switch for coupling said second switching signal to said gate electrode of said second MOS power transistor switch;
switching means having a first main current conducting terminal that is coupled to said gate electrode of said first MOS power transistor switch and a pair of control terminals that are coupled to said gate electrode of said second MOS power transistor and to a source electrode thereof, respectively, such that after a change in said second switching signal occurs that causes said second MOS power transistor to become less conductive, said switching means attenuates a signal that is developed at said gate electrode of said first MOS power transistor in accordance with a voltage that is developed between said gate and said source electrodes of said second MOS power transistor and that is applied between said pair of control terminals so as to prevent simultaneous conduction in said first and second MOS power transistors.

13. An apparatus according to claim 12 wherein said switching means comprises a third transistor and wherein a feedback signal is coupled from a collector electrode to a base electrode of said third transistor for preventing said third transistor from being in saturation so as to reduce a turn-off transition time in said third transistor.

14. An apparatus according to claim 13 wherein said feedback signal generating means comprises a diode coupled between a base electrode and a collector electrode of said third transistor to form a feedback path that prevents said third transistor from being in saturation immediately prior to said turn-off transition time.

15. A power supply apparatus, comprising:
a source of an input supply voltage;
an inductance coupled to said source and to a load for transferring power from said source to said load;
first and second MOS power transistor switches coupled to said source and to said inductance in a push-pull configuration;
a source of first and second switching signals coupled to respective gate electrodes of said first and second MOS power transistor switches for operating the two switches in a push-pull manner;
switching means having an output coupled to a gate electrode of said first MOS power transistor switch and an input coupled to a gate electrode of said second MOS power transistor switch and responsive to a difference in voltage between the gate electrode and a main current conducting electrode of said second MOS power transistor switch that is developed when said second switching signal decreases the source-drain conduction of said second MOS power transistor switch for maintaining said first MOS power transistor switch nonconductive for an interval that avoids any significant simultaneous conduction of the two MOS power transistor switches during push-pull operation.

* * * * *